United States Patent [19]

Stella

[11] Patent Number: 4,882,386

[45] Date of Patent: Nov. 21, 1989

[54] CURABLE RUBBER COMPOSITION

[75] Inventor: Giandomenico Stella, Brussels, Belgium

[73] Assignee: Exxon Chemical Patents Inc., Linden, N.J.

[21] Appl. No.: 123,329

[22] Filed: Nov. 20, 1987

[30] Foreign Application Priority Data

Nov. 21, 1986 [GB] United Kingdom ................. 8627905

[51] Int. Cl.$^4$ ............................................. C08L 61/10
[52] U.S. Cl. ..................................... 525/133; 525/141; 525/144; 525/145
[58] Field of Search ................. 525/141, 133, 144, 145

[56] References Cited

U.S. PATENT DOCUMENTS 3,586,735  6/1971  Giller et al. .......................... 525/139
4,699,832  10/1987  Sattlemeyer ..................... 525/133 X

FOREIGN PATENT DOCUMENTS 1015274  12/1965  United Kingdom .
1379737   1/1975  United Kingdom .
1449049   9/1976  United Kingdom .

*Primary Examiner*—Theodore E. Pertilla

[57] ABSTRACT

A rubber composition which in the cured state shows improved adhesion to substrate through hydroxyl-reactive adhesives such as polyurethane comprises a first elastomer such as EPDM which shows generally poor adhesion, a minor proportion of a halogenated elastomer, phenol resin, a curative system for covulcanizing the elastomer, and an aminic substance which catalyses reaction between the resin and isocyanate containing adhesives.

15 Claims, No Drawings

CURABLE RUBBER COMPOSITION

This invention relates to curable elastomeric compositions which in the cured state have improved adhesion to polar adhesive systems. It is further concerned with methods of adhering objects formed from such compositions to substrates, and particularly but not exclusively to techniques for sealing windscreens into automobile bodies.

An elastomeric material which has found increasing use as a sealing element in the automobile industry is EPM or EPDM. Many of these uses include the step of adhering the rubber to a substrate such as glass or metal, for example, in the manufacture of adherable sealed windscreens. EPM or EPDM also has many applications in which it is required to adhere the rubber in sheet form to itself, that is, the splicing of sheets.

A difficulty which is often encountered is that EPM and EPDM are not readily compatible with the adhesive systems commonly employed in industry. Thus the adhesive bond is not strong enough for certain applications. A particular use of elastomeric materials is in fixing windscreens into automobiles. Traditionally the fixing stage has been performed in the automobile manufacturing plant, where a rubber gasket, specially shaped to co-operate with the dimensions and shape of vehicle body members is used to receive the windscreen and mechanically hold it in position in the body.

Assembly is manual, and involves first slotting the rubber gasket onto the windscreen, and then feeding the receiving slots in the gasket onto the vehicle body. Nowadays, there is a move towards automatised assembly plants, which do not readily lend themselves to such time consuming fixing of structural gaskets and insertion of screens.

A more modern technique which has been developed to meet the problem of automatisation is so-called direct glazing. Here, the windscreen glass is directly adhered to the painted metal body members of the vehicle, so forming a waterproof seal. Such a direct glazing technique increases the structural rigidity of the vehicle, and hence permits a weight reduction through use of thinner car body plates. However, there is a disadvantage that with a direct glazed system, the joint between the glass and the metal is very rigid and transmits vibrations to the roof panel of the vehicle; in some circumstances such rigid joint could lead to deformation of the roof panel if the vehicle lower body members flex, for example, when the vehicle mounts a pavement or sidewalk. There is thus a desideratum for a rubber cushion between the windscreen and the car body member, which is sealed to both the windscreen glass and to the body metal but which does not require the extensive handling characteristic of current gaskets during assembly/production.

Such a cushion would damp vibrations, so reducing forces transmitted to the vehicle roof panel, and moreover would absorb tolerances in the mounting procedure which, if the rubber cushion is mounted by adhesion to the glass and to the body metal, could be performed on a robot production line.

Such a cushion arrangement of course requires a good adhesive bond between the rubber and glass, and between the rubber and the vehicle body metal.

EPM and EPDM have suitable physical characteristics with regard to automobile use, but are generally deficient in their ability to adhere to glass or metal substrates. Thus there is a need to improve the adhesion of EPM and EPDM to substrates of for example glass and metal whilst using the polar adhesive systems which are commonly employed in industry.

Various attempts have been made in the art to improve the adhesion properties of polymers. Thus GB 1015274 (Esso Research and Engineering Company) discloses tie gums which are useful in bonding together different types of elastomers, more particularly low unsaturation rubbers of high hysteresis such as butyl or halobutyl rubber (used as tire treads) and high unsaturation rubbers of low hysteresis such as styrene butadiene rubber (SBR) and natural rubber (used as tire carcasses). Such tie gums comprise from 75–85% halogenated low unsaturation rubber e.g. chlorobutyl and from 15–25% of a combination of two high unsaturation rubbers e.g. SBR and natural rubber, and other components which may be present include a sulphur cure system, a non-reactive phenol dialcohol resin and small proportions of certain amines such as diphenyl guanidine. The tie gums of this prior art are employed as intermediate components in composite tires, the components of which are brought together under heat and pressure to obtain a cured, composite system. However it is clearly stated (page 9 lines 2–7) that at least 80 phr halogenated low unsaturation rubber are required to achieve satisfactory adhesion to the tread compound, and no mention is made of rubbers such as EPM or EPDM, least of all as major components of the blend. Moreover, there is no suggestion that the tie gums as disclosed were found to have improved adhesion to substrates through polar adhesives when in the cured state. It should also be noted that in this publication a pair of high unsaturation rubbers is required (in minor proportion) to be blended with the halogenated rubber, and in any case EPM and EPDM, with which the present invention is principally concerned, are not high unsaturation rubbers.

GB 1379737 (International Synthetic Rubber Company Limited) discloses uncured adhesive compositions which are said to provide good adhesion between compositions based on EP copolymer rubbers, when the rubber substrates and the adhesive compositions are brought together under curing conditions of temperature and pressure. The adhesive composition comprises a blend of chlorobutyl rubber and an unsaturated ethylene/alpha olefin copolymer of intrinsic viscosity (I.V.) more than 1.4, carbon black, liquid isobutene polymer, a second (saturated) ethylene/alpha olefin copolymer, of lower I.V., a tackifying resin and a sulphur vulcanisation system. The composition is said to have good adhesion to elastomers and to retain its tackiness for considerable periods of time, in other words it is, by virtue of its components, uncured and inherently adhesive, which can be used to adhere elastomers together by a curing process. This is to be distinguished from compositions which in the cured state have rubber properties characteristic of the major elastomer component, but which have been modified by a synergistic selection of components to improve the adhesion of the major elastomer component to substrates through the medium of conventional polar adhesives.

GB 1449049 (Exxon Research and Engineering Company) discloses cured painted elastomer compositions comprising butyl or EPDM rubber((or their chlorine or bromine derivatives) cured with a heat reactive phenol-aldehyde resin and a metal oxide or halide and optionally chloro sulphonated polyethylene or chloro- or bromopolyisobutylene or butyl rubber, provided that at least one of the constituents serves as a halogen donor to the system. This publication states (page 2 lines 73-78) that peroxides and the usual sulphur cures are not suitable for the compositions described since they do not result in vulcanisation which have the necessary adhesion qualities for coating with polyurethane base paints. Instead the authors require the generally less convenient reactive phenol resin to be employed as curative in order to yield a product which can be readily painted. It is noted that in one blend (Example 7, composition XII) a curative system is used which comprises bromomethyloctyl phenol formaldehyde resin in combination with sulphur and sulphur activators. This is used to cure an EPDM/chlorobutyl rubber mixture, and the cured product is said to be paintable. However, the resin is clearly a reactive curative, and the blend disclosed does not contain any components which function to inhibit chlorobutyl crosslinking or to act as non-reactive promoters of coupling between the rubber and an adhesive system.

According to the present invention there is provided a curable rubber composition which in the cured state has improved adhesion to substrates through hydroxyl-reactive adhesives which composition comprises a blend of (a) a first elastomer having generally poor adhesion to such adhesives and comprising a copolymer of ethylene with at least one alpha-olefin and optionally a minor proportion of at least one copolymerisable polyene;

(b) a second elastomer being a halogenated elastomeric polymer which is covulcanisable with the first elastomer and comprising a minor proportion of the combined weight of said first and second elastomers;

(c) a phenol resin;

(d) a curative system for the first and second elastomers; and (e) an aminic substance capable of catalysing reaction between the phenolic groups of the phenol resin and isocyanate containing adhesives.

Provided appropriate conditions are selected, the composition as defined above can be prepared by any conventional mixing technique. It will be appreciated that the curative system will contain curatives for elastomers (a) and (b) which it is possible to incorporate at different stages. However, it is preferred to employ a mixing process wherein the curative system (d) containing curatives for both rubber types (a) and (b) is added in a final stage. This is particularly preferred because it enables high temperature mixing of the other components without curing taking place, more especially without the curing of the second elastomer component (b) which might otherwise form a microgel in the composition.

Accordingly a second aspect of the invention provides a process for producing a curable rubber composition as defined above, which comprises (i) forming a premix of components (a), (b), (c) and (e); and (ii) blending the premix with the curative system (d).

It will be appreciated that vulcanisation of the blend can be performed simultaneously with the mixing stage (ii), or alternatively, the covulcanisation can take place subsequent to mixing in the curative system.

In one embodiment of the process defined above step (i) is performed, e.g. in an internal mixer, preferably at 100°–180° C., more preferably 110°–150° C., and dumped after a mixing time at temperature of e.g. 2–3 minutes, depending on the nature of the mixer used. Step (ii) is preferably performed at a temperature below 90° C. to avoid curing in the mixer.

The preferred features of the composition of the invention as described hereinbelow apply equally to the components employed in the process of the invention. Thus the first elastomers (a) having a generally poor adhesions to hydroxyl-reactive adhesives are ethylene—higher alpha olefin copolymer rubbers such as ethylene-propylene copolymer rubber (EPM), or elastomeric terpolymers of ethylene and at least one other alpha olefin and a minor proportion of at least one copolymerisable polyene, or mixtures thereof. As mentioned hereinbefore, the terpolymer rubbers have many desirable properties but in general are poor in adhesion characteristics. Thus, component (a) of the composition is preferably an ethylene-propylene-diene terpolymer of the type well known in the art and defined by their normal ASTM designation.

These materials are commonly termed EPDM, and generally contain up to about 10 weight percent of copolymerisable diene. Examples of non-conjugated diolefins which may be employed are 1,5-hexadiene, dicyclopentadiene 1,5-octadiene or a 2-alkyl norbornadiene, preferably ethylidene norbornene or methylidene norbornene. Techniques for manufacturing such terpolymers are well known and form no part of this invention.

The halogenated elastomeric polymer which is employed as component (b) of the composition and process of the invention may be for example a halogenated butyl rubber such as chlorobutyl or bromobutyl, polychloroprene, chlorosulphonated polyethylene or epichlorhydrin. It is particularly preferred to employ halogenated butyl rubbers. Unmodified, unvulcanised butyl rubbers generally comprise a copolymer of a major proportion, for example 85–99.9 wt %, preferably a $C_4$ to $C_8$ isoolefin such as isobutene, with a minor proportion, for example, 0.1 to 15 wt % preferably 0.5 to 5 wt % of a $C_4$ to $C_{14}$ multi-olefin, preferably a $C_4$ to $C_8$ diolefin such as butadiene, dimethylbutadiene, piperylene or isoprene. Such butyl rubber, for example one obtained by reacting 95 to 99.5 wt % of isobutylene with 0.5 to 5 wt % of isoprene, may be halogenated, for example chlorinated or brominated, so as to contain preferably at least 0.5 wt % and no more than 3.0 wt %, more preferably from 1.0 to 2.0 wt % of combined halogen, and with a particularly preferred halogen content of from 1.1 to 1.3 wt %. These are the preferred elastomer (b) components.

It has been found that for a given halogenated elastomeric polymer (b), the greater the halogen content, the greater is the risk of scorching in production of the compositions of the invention. For halogenated butyl rubber, the maximum preferred halogen content is 3.0 wt %.

The molecular weight of the halogenated elastomeric polymer (b) is not of particular importance in the compositions of the invention, although low Mooney values give advantageous mixing characteristics. The Mooney ML (1+4) at 100° C. is preferably, therefore, below 90, for example in the range 50–60, which corresponds to a molecular weight of about one million.

Typically the halogenated butyl rubber which is preferably employed as component (b) will have a preferred viscosity average molecular weight of for example from 150000 to 1500000; the mole percent unsaturation is preferably from 0.5 to 15%.

The amount of second elastomer (b) in the blend is preferably kept to a minimum, such that the properties of the first elastomer (a), e.g. EPDM, (other than its adhesion characteristics) are not substantially altered by other components present. In other words, the first elastomer (a) is preferably the major elastomer component of the blend of (a) and (b). For example, the blend may comprise from 5 to 45 parts by weight of component (b) per 100 parts by weight of the combined content of elastomeric components (a) and (b) (phr). More preferably, the component (b) content of the blend is from 15-35 phr, and particularly preferred is a content of from 20-30 phr.

The amount of phenol resin employed in the blend depends upon the proportion of said polymer (b). Thus the weight ratio of resin to polymer is preferably from 1:1-1:3, more preferably about 1:2. It has been shown that a relatively small amount of resin is sufficient to impart adherability to the compositions of the invention.

The blend preferably comprises from 2 to 25 more preferably from 10 to 20 and for example about 15 parts by weight of resin per 100 parts by weight of combined elastomeric components (a) and (b) (phr).

The resin component of the blend is generally termed an alkyl phenol/aldehyde resin. The preferred aldehydes from which the resins may be derived are formaldehyde such as paraformaldehyde, or acetaldehyde or furfural, and the resin may be produced by condensation of the phenol and aldehyde in the presence of a small amount of an acid. Particularly suitable resins are those known as SP 1068 or SP 1077 (Schenectady).

It is particularly preferred that the phenol resin component (c) is non-reactive, which may otherwise be expressed as that it has free ortho positions on the terminal phenols, i.e. the resin has no terminal methylolic groups. Without wishing to be bound by theory, it is believed that during production of the blend it is through one of these terminal ortho positions that the resin molecule couples onto the halogenated elastomeric polymer at a halogen site. Compositions of the invention may also be obtained with alkyl phenolic resins containing methylolic end groups but at somewhat reduced processing latitude, since such resins are reactive and so conditions must be closely controlled to avoid undesired reactions taking place. For example, with reactive resins it is preferred to mix at a temperature below about 110° C. to minimise resin crosslinking of the halogenated elastomer chains, which would reduce the effectiveness of the resin in improving the adhesion properties of the major elastomer component (a). Furthermore, the reactive resins are rather more expensive than non-reactive resins and so are unfavoured for commercial reasons too.

Accordingly, a particularly preferred embodiment of the invention provides a curable rubber composition which in the cured state has improved adhesion to hydroxyl reactive materials which comprises a blend of (a) a major proportion of EPDM; (b) a minor proportion of a halogenated elastomer, (c) a phenol resin; and (d) a curative system for the EPDM and the halogenated elastomer, characterised in that the halogenated elastomer is halobutyl rubber, the phenol resin is non-reactive, the curative system is substantially exclusive of reactive phenol resins, and in that the blend additionally includes (e) an aminic substance capable of catalysing reaction between the phenolic groups of the non-reactive resin and isocyanate containing adhesives.

Preferably, the alkyl radicals carried on the phenol groups of the resin are sufficiently long to promote compatibility between the resin and the rubber, for example being from $C_6-C_{12}$ alkyls and preferably octyl.

The chain length of the resin itself is believed to be not relevant to its function, although to facilitate the production of the blend it is preferred that the resin should have a melting temperature below the mixing temperature, and chain length has an effect on this.

Thus a resin with four phenol groups in the chain is preferred; resins with a melting temperature of from 60°-120° C. are preferred, more preferably from 80°-115° C., especially from 85°-110° C.

The curative system employed in the composition and process of the invention depends on the nature of the elastomer components (a) and (b). Regarding elastomer (a), when this is saturated e.g. EPM copolymer, the curative system is preferably a free radical type, such as those based on peroxide, and any of the well known peroxide systems suitable for curing EPM may be employed. When elastomer (a) contains unsaturation, e.g. EPDM terpolymer, the curative system may contain for example sulphur (in elemental and/or compound form) optionally with an activator such as a metal oxide. The metal is preferably of group IIB, IIIB, IVB or VIII of the periodic table, with zinc oxide being particularly preferred. Preferably the metal oxide is used in an amount of from 3-20 phr.

The particular curative system adopted (for example mixtures containing peroxides or sulphur, MBT, TMDTS, ZDEDC, DPTTS, TDEDC and the other known curative components which are well understood in the art), will be selected on the basis of the required rate of cure and the nature of the rubbers contained in the blends. The amounts of curatives used will be dependent on the degree of cure required in the rubber system. Conventional additives for aiding curing, such as stearic acid, may also be included. By way of example, the curative system (d) may be incorporated in an amount of from 10 to 20 parts by weight per 100 parts by weight of elastomers (a) and (b) combined. It will be appreciated that the curative system (d) is one which is effective to achieve covulcanisation of both the elastomer components (a) and (b). Typical curatives for (a) have already been mentioned. As to elastomer (b), any appropriate curative may be employed. Preferably where (b) is a halogenated butyl rubber the curative comprises a polyvalent metal compound such as a metal salt or oxide which under the mixing conditions readily converts to a free metal ion. The metals may be for example zinc, iron, aluminium, antimony or tin, and zinc oxide or zinc stearate are particularly preferred; zinc stearate gives ready solubilization. The polyvalent metal compound curative is preferably used in an amount of 3-15, more preferably 5-10 parts by weight per 100 parts by weight of combined elastomeric components (a) and (b). It will be appreciated that such a curative may also function as an activator for certain of the curative packages which may be employed to achieve vulcanisation of elastomer (a).

As mentioned hereinbefore, the phenol resin component (c) is preferably non-reactive, and hence it is also preferred that the curative system (d) does not comprise a reactive phenol resin. Indeed it is a feature of this invention that elastomer compositions can be obtained which have been cured using the entirely conventional, well tried and hence cheap curative packages which are routinely used for curing rubbers such as EPM and EPDM, without the need to resort to expensive alternatives such as reactive phenol resins. It is the unique and synergistically acting combination of components as defined which enables such compositions, having the desired improvement in adhesion through polar adhesives, to be produced at commercially acceptable cost.

With regard to component (e) of the compositions of the invention, this is an aminic substance which in the finished cured composition is capable of catalysing the reaction between the phenolic groups of the phenol resin component (c) and the active entity of hydroxy-reactive adhesive systems such as isocyanate-containing adhesives. Extensive evaluation has shown that not all amine substances are capable of giving this effect, and without wishing to be bound by theory it is believed that effectiveness in compositions of the invention depends at least partially on steric factors. Thus it is preferred that the aminic substance (e) should have a combination of high amine basicity and a low steric hindrance of the aminic moiety. The effectiveness of aminic substances in compositions according to the invention is readily assessible by a few simple tests well within the capability of those skilled in the art, and indeed the steric hindrance effect of substituents adjacent the amine group may readily be assessed from a knowledge of the molecular geometry of the particular aminic substance in question. For example amines which have a plurality of alkyl group substituents adjacent thereto (e.g. iso propyl) are generally less suitable than amines which have substituents with low steric effect e.g. phenyl groups. It is preferred to use an aminic substance which contains at least two secondary amine groups, each substituted with at least one aryl group and not having other substituents which are less sterically favourable than phenyl. Examples of such aminic substances are diphenylguanidine and N, N'-diphenyl-p-phenylene diamine. Other aminic substances which have been found effective for the purposes of this invention are pyridine and triethanolamine, which typify those aminic substances having low steric hindrance and which moreover have enhanced basicity by virtue of the nature of the molecular entities adjacent the nitrogen atom.

The aminic substance (e) is preferably employed in an amount of from 1-10, more preferably from 1.5 to 5 and especially about 3 parts by weight per 100 parts by weight of combined elastomers (a) and (b). The composition of the invention may of course also contain the usual fillers and process additives such as carbon blacks, oils, and mineral fillers such as carbonates or clays, which are conventional in the rubber blending art. However, it has been found that the improvement in the adhesion properties conferred on elastomer (a) is reduced if the composition contains effective amounts of additives which function to absorb or react with the amine groups of component (e) or the hydroxyl groups of component (c), an example of such material being silica. This undesirable effect is also found if the composition includes additives with which, in the cured composition, isocyanate groups of an adhesive system tend to react in preference to the hydroxyl groups of the phenol resin component (c); examples of such an additive is diethylene glycol and polyethylene glycol. Additives of the above types are therefore preferably completely absent from the compositions of the invention, however they may be present in relatively low proportions provided the resultant decrease in adhesion is acceptable. Amounts of such additives which may be tolerated may readily be determined by simple experiment, but preferably the compositions of the invention contain less than 20 phr silica, more preferably no more than 10 phr silica; ideally glycols are totally absent.

The compositions of the invention may be cured by any of the conventional techniques such as steam curing, press curing or continuous vulcanisation, for example in an extruder. The curing temperature depends on the nature of the rubbers and curatives employed, but is preferably from 140° to 250° C.

The compositions of the invention may of course be formed into shaped objects which benefit from the improvement in adhesive characteristics which has been conferred on the first elastomer (a). Such shaping may be, for example by means of extrusion through a die of desired cross section e.g. such as to convert the composition into the form of a profile for locating windscreens into automobile bodies, or simply into sheet form.

As noted above the composition will be formed into an object of required shape for the particular end-use for which it is to be put. Thus it is particularly preferred that the components should be mixed together in a mixing extruder such that the composition is shaped by means of extrusion through a die of desired shape. Such a technique permits continuous covulcanisation to take place, with the composition either being cured in the extruder or subsequently in for example a UHF oven or in a salt bath, or by means of steam curing techniques. The actual technique employed will depend on the end-use envisaged for the product and the particular curative system selected for the process.

The compositions of the invention have proved to be particularly effective in their adhesion to certain adhesive systems when in the cured state. Thus a further aspect of the invention provides a method of adhering to a substrate a shaped object formed from such a cured composition which comprises applying to the substrate and/or the object a hydroxyl-reactive adhesive, bringing the substrate and object into contact via the adhesive and allowing the adhesive to harden.

A form of adhesive system conventionally employed industrially is based on polyurethane which is generally produced immediately prior to use by exposing a prepolymer which contains hydroxyl reactive isocyanate groups to atmospheric moisture. Such adhesive systems are popular in industrial applications since they offer the right balance of low toxicity; rapid green tack development (i.e. they stick well before they are fully cured); and high adhesive strength after a few days storage at ambient conditions.

Among the polyurethane type adhesive tapes employed for example by automobile manufacturers may be mentioned Betaseal 71904 (marketed by GURIT-ESSEX AG).

Other adhesive systems which have been found useful in relation to the composition and method of the present invention are those generally termed epoxy adhesives and acrylic adhesives. In these, as with polyurethane adhesives, the prepolymer form is known to be reactive with hydroxyl (phenolic) groups and so polymerization in contact with an elastomeric composition which is hydroxyl (phenol) functionalized will give much improved adhesive bonding to the blend and the substrate to which the adhesive is applied.

EPDM is not generally adherable through the structural adhesives normally used in industry. Specifically, EPDM compounds do not stick to one—package adhesive systems based on isocyanate—terminated prepolymers that cure through the action of moisture in air. Such types of adhesive are in fact currently used in the automobile industry for direct adhesion of glass windscreens to painted metal automobile body parts, and the poor adhesion of EPDM to such systems has resulted in such rubber, which has other properties making it eminently suited for use as automobile weatherstrips, failing to be accepted by the industry.

A further difficulty which has been encountered by EPDM users is its poor self adhesion when in sheet form i.e. it is difficult to get satisfactory bonding of EPDM sheets using conventional adhesive systems. An adhesive which has routinely been used with EPDM sheeting is neoprene. Such an adhesive is not particularly good for cured EPDM; however it has been found it generally gives much improved effect with the compositions of the invention when the neoprene is combined with an isocyanate hardener.

A preferred method of the invention is therefore the case where both the substrate and the object in question comprises a cured rubber composition of the invention or as produced by the defined process, particularly where the substrate and object are in sheet form. Such sheet bonding is greatly strengthened where the adhesive system comprises neoprene/isocyanate, or polyurethane per se.

Desirably the compositions of the invention have self adhesion properties through such adhesives wherein the peel strength as measured on 2.5 cm wide strips exceed 15, 20, 25, 30 or even 40 Newtons.

It has also been found that the method is particularly useful for inorganic substrates such as glass or concrete, polymer fibres or metals. Thus in the case of metals which may optionally be painted, the method may be employed to adhere sheets of EPDM based composition to the reinforcing metal which is employed in the production of hydraulic hoses.

The hoses may comprise oil-resistant nitrile rubber or neoprene rubber and a wire or textile reinforcement. The EPDM-based composition according to the invention is adhered to this reinforcement by means of an adhesive system having a hydroxyl-reactive functionality. In a preferred embodiment, the method may be one wherein the rubber composition is formed into the shaped object by moulding it into the desired shape in contact with the substrate via the adhesive, this being particularly applicable to the production of metal reinforced artefacts such as hoses or tires.

In the case where the substrate comprises polymer fibres, these may be for example fibres of polyester or nylon, such as are employed in flocked profiles used in automobile window sealing systems. To produce such a flocked profile, adhesive is preferably applied to a cured or semi cured shaped composition of the invention, which is then passed into an electrostatic environment whereby the fibres are delivered into contact with the adhesive in oriented manner.

The compositions of the invention have been found to be particularly suitable when formed into extruded sealant gaskets for vehicle windscreen weather strips. Thus yet another aspect of the invention provides a technique for sealing a windscreen into an automobile body which comprises adhering a sealing element formed from a cured composition as hereinbefore defined to the windscreen edge by the method as hereinbefore defined wherein the substrate is windscreen glass, and adhering said sealing element to the automobile body by the method as hereinbefore defined wherein the substrate is a structural member of the body adapted to receive the windscreen. Thus the sealing gasket or weatherstrip is preadhered to the glass of the windscreen for example using a polyurethane adhesive system, at its edge, and this is delivered up to the car body member which has also been treated with for example polyurethane tape.

The composition, which is preferably EPDM-based, is maintained in contact with the adhesive until the initial rubber to metal adhesion develops. The car body member may be provided with a lug for engaging with a co-operating portion of the weather strip, so that the windscreen is effectively snapped onto the car body to secure it in place whilst the adhesive is hardening.

The following Examples illustrate the invention. Examples designated "c" are by way of comparison.

EXAMPLES 1-7

Seven unfilled elastomeric compositions comprising the components as set out in Table 1 (units of parts by weight per 100 parts of elastomer components phr) were prepared by first forming a preblend excluding curative, and then adding a curative package comprising:

| Curative component | phr |
|---|---|
| ZnO | 5 |
| Stearic Acid | 1 |
| S | 1.5 |
| MBT | 1.5 |
| TMTDS | 2.5 |

The compositions were produced in a 50 cc Brabender mixer operated at 20 RPM. Initially the mixer was adjusted to a temperature of about 80° C. and the preblend components were added and mixed to a temperature of about 110° C. over a period of 18 minutes, followed by dumping. The composition was then finalised in a second Brabender pass by introducing the preblend mixture into the mixer at 75° C. and operated at 15 RPM. The temperature was increased to about 85° C. over a period of 4 minutes, with the curative package being introduced after 2 minutes mixing. The finalised composition was dumped at 85° C. when the 4 minute period was up.

With regard to the compositions, SP 1068 is an alkyl phenol formaldehyde resin having free terminal ortho positions, marketed by Schenectady Chemical Company.

It has a softening point in the range 85°-110° C. and a maximum acid index of 35; Vistalon 7000 is an EPDM marketed by Exxon Chemical Company with medium range % ENB as diene and having ethylene/propylene in a 70/30 ratio, its Mooney viscosity ML(1+8) at 127° C. being 55. Esso CB 1066 is a chlorinated butyl rubber marketed by Exxon Chemical Company having a Mooney viscosity ML (1+8) at 100° C. (ISO R289, radial cavity machines) of 49-58; a chlorine content of 1.1-1.3% wt, a minimum modulus at 300% elongation of 4.8 MPa, and a viscosity average molecular weight of 400000. DPG is diphenyl guanidine and Maglite DE is magnesium oxide supplied by AKZO and used to delay cure onset and microgel formation in the chlorobutyl rubber in the pre-blending stage. The other components (curatives) are all well known and commonly available materials, MBT being mercaptobenzothiazole and TMTDS being tetramethyl thiuram disulphide.

Each composition was subjected to press curing at 180° C. for 5 minutes, to form cured sheets which were then cut into strips to enable the self-adhesion properties of the compositions to be evaluated. The cured strips measured 7.5 cm×2.5 cm and were treated prior to application of adhesive by brushing with isopropanol and wiping with a clean cloth. Pairs of strips were then assembled by applying fresh adhesive by gun and spatula to the cleaned surface of one of the pair and placing the cleaned surface of the second of the pair into contact with the adhesive, to give a sandwich with contact area 2.5 cm×5.0 cm. The bond was immediately consolidated by 20 passes of a 1 kg weight handroll.

For each of the compositions specified in Table 1, three such sandwiches were prepared and each was then stored for 5 days at room temperature. Thereafter each sandwich was tested for peel strength on a Zwick tensometer operated at a speed of 5 cm/minute. The peel strength value reported in Table 1 for each composition is the average of the measurements on the three sandwiches. The results are reported in units of Newtons, for a bond 2.5 cm in width.

The adhesive system employed for Examples 1-7 was a polyurethane prepolymer tape-form type adhesive containing isocyanate groups and sold as 425 g cartridges by Gurit Essex AG of Switzerland, under the trade name Betaseal 7 1904 HV VP 02508-2.

From the peel strengths shown in Table 1 it can readily be seen that Examples 5 and 7 (compositions of the invention) show much improved self adhesion through the isocyanate containing adhesive, than the comparison compositions of the other Examples. In particular, compositions containing no phenol resin have very poor self adhesive properties (Examples 1 and 4); increased phenol resin content gives improved self adhesion (Examples 2 and 3, 5 and 7); compositions containing an amine substance without phenol resin give very poor results (Example 4); whereas from Examples 5 and 7 it can clearly be seen that the compositions containing all of the components required in accordance with the invention show a synergism which leads to surprisingly high peel strength values. It is also noted that the elastomeric components are required to comprise both (a) and (b); compositions based on (a) alone without (b) (Example 6) give results which are no better than Example 2. In general, self adhesion peel strength values (measured as described) are considered to be good if greater than 15N and exceptional if in excess of 20N.

EXAMPLES 8-15

Eight unfilled elastomeric compositions as specified in Table 2 were produced using the same curative package and by the same method as was used for Examples 1-7. the only difference from Examples 1-7 was that the nature of the aminic substance present as component (e) was varied.

TABLE 1

| Example | | 1c | 2c | 3c | 4c | 5 | 6c | 7 |
|---|---|---|---|---|---|---|---|---|
| Preblend | | | | | | | | |
| Vistalon 7000 | (a) | 70 | 70 | 70 | 70 | 70 | 100 | 70 |
| Esso CB 1066 | (b) | 30 | 30 | 30 | 30 | 30 | — | 30 |
| Maglite DE | | 0.5 | 0.5 | 0.5 | 0.5 | 0.5 | 0.5 | 0.5 |
| SP 1068 Resin | (c) | — | 8 | 15 | — | 8 | 15 | 15 |
| DPG | (e) | — | — | — | 3 | 3 | 3 | 3 |
| Curative | (d) | 11.5 | 11.5 | 11.5 | 11.5 | 11.5 | 11.5 | 11.5 |

TABLE 1-continued

| Example | 1c | 2c | 3c | 4c | 5 | 6c | 7 |
|---|---|---|---|---|---|---|---|
| Adhesion | | | | | | | |
| N/2.5 cm (Peel) | 0.6 | 9.3 | 12.1 | 3.6 | 16.3 | 10.3 | 26.8 |

The aminic substances used were as follows:
DPG— Diphenyl Guanidine

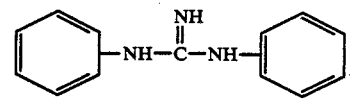

a white powder with melting point 145-° C.
IPPD— N-Isopropyl-N'-Phenyl-P-Phenylenediamine

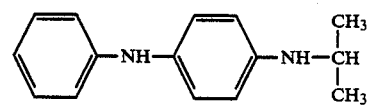

Dark, purplish grey flakes
Melting point 70-77° C.
DPPD— N,N', - Diphenyl-P-Phenylene-Diamine

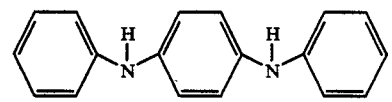

a black solid, melting point 145-150° C.
TEA— Triethanolamine

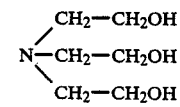

A viscous, hygroscopic liquid

The compositions thus produced were cured and formed into test pieces as described for Examples 1-7, and sandwiches were prepared and peel strengths measured in a fashion identical with that described in Examples 1-7. The results are reported in Table 2, from which it may be seen that once again the compositions which do not contain all of the components as specified for the compositions of the invention have very low self adhesion peel strengths through the specified adhesion system. More interestingly it can also be seen that not all aminic substances function as component (e) in accordance with the invention by promoting reaction between the phenolic groups of the phenol resin and the hydroxyl-reactive component of the adhesive. In particular IPPD does not so function (Example 13) whereas DPG, DPPD and TEA do (Examples 12, 14 and 15). These Examples 8-15 show that the efficacy of aminic substances may be readily tested by those of ordinary skill in the art, simply by performing a few experiments. Furthermore the likely usefulness of an aminic substance in compositions of the invention can be gauged conveniently by a consideration of the steric properties of the molecules. Thus the aminic substances which have been found to be the most effective are those having a high basicity (electron density) combined with low steric hindrance of the nitrogen atoms. Referring by way of illustration to Examples 13 and 14, IPPD is more basic than DPDD, but it will be readily recognised that IPPD has a much greater degree of steric hindrance by virtue of the bonded isopropyl group, compared with the bonded phenyl group of DPPD.

It is noted that the compositions of the invention have a surprisingly high peel strength compared with the conventional comparison compositions; all are above 20N, Examples 12 and 15 are above the desirable 25N value and Example 15 is above the most desirable 30N level.

TABLE 2

| Example | | 8c | 9c | 10c | 11c | 12 | 13c | 14 | 15 |
|---|---|---|---|---|---|---|---|---|---|
| Preblend | | | | | | | | | |
| Vistalon 7000 | (a) | 70 | 70 | 70 | 70 | 70 | 70 | 70 | 70 |
| Esso CB 1066 | (b) | 30 | 30 | 30 | 30 | 30 | 30 | 30 | 30 |
| Maglite DE | | 0.5 | 0.5 | 0.5 | 0.5 | 0.5 | 0.5 | 0.5 | 0.5 |
| SP 1068 resin | (c) | — | — | — | — | 15 | 15 | 15 | 15 |
| DPG | (e) | 3 | — | — | — | 3 | — | — | — |
| IPPD | | — | 3 | — | — | — | 3 | — | — |
| DPPD | (e) | — | — | 3 | — | — | — | 3 | — |
| TEA | (e) | — | — | — | 3 | — | — | — | 3 |
| Curative | (d) | 11.5 | 11.5 | 11.5 | 11.5 | 11.5 | 11.5 | 11.5 | 11.5 |
| Adhesion | | | | | | | | | |
| N/2.5 cm (Peel) | | 4 | 1 | 1 | 5 | 26.8 | 2 | 20.3 | 31.3 |

EXAMPLES 16-17

Two filled elastomeric compositions as specified in Table 3, were produced by preparing a masterbatch in a Banbury internal mixer of net chamber volume 1.55 liter operated at 112 RPM. The mixer was loaded to 70% of net chamber volume and upside down dumping was carried out at 140° C. after about 3 minutes. The composition was then finalised on a mill by addition of the sulphur curative package.

OMYA BL (ground calcium carbonate, supplied by Pluss-Stauffer), Ultrasil VN2 (silica, supplied by Degussa) and FEF N550 (carbon black) are all fillers well known in the art, and FLEXON 876 is a well known extender oil. A small proportion of silica was introduced in this case, even though known to reduce adhesion, because it brings certain advantages in hot tear strength. In Table 3, MBTS represents mercapto benzothiazyl disulphide, ZDEDC represents zinc diethyl dithio carbamate, and ZDBDC represents zinc dibutyl dithio carbamate.

Processability of the compositions was characterised by measurement of viscosity versus temperature on a Monsanto Rheometer, the values obtained being the minimum torque (pound inch) measured on a rheometer operating with $+/-5°$ arc at 180° C. ML represents the viscosity of the molten composition before crosslinking occurs, and MH represents the maximum viscosity reached after crosslinking. Also measured were $t_{S2}$, the time in minutes for crosslinking to onset to the extent that the rheometer torque reaches 2 pound inches above the $M_L$ value; and $tc_{90}$, the time in minutes for the rheometer torque to reach a value corresponding to 90% of the difference between the maximum M rheometer torques. Results are reported at Table 3.

Samples of the compositions were press cured at 180° C. for a time corresponding to 1.1 times the measured $tc_{90}$ value, and the cured sheets were cut into samples and tested for self adhesion properties in exactly the same way, using the same adhesive and techniques, as was used with Examples 1-7.

The peel strength results are reported in Table 3, as are the results of physical property measurements made on the press cured sheets. Shore A hardness was measured on an available commercial tester, and the remaining properties were measured in accordance with ASTM D 412.

From Table 3 it may be seen that the composition of the invention (Example 16), which in most respects and physical properties is typical of EPDM compounds useful in automobile profiles, has a vastly and surprisingly improved peel strength compared with the composition of Example 17 which does not have all of the synergistically acting components required in accordance with the invention.

EXAMPLES 18-20

Three elastomeric compositions suitable for sheeting applications, as shown in Table 4, were prepared by the method described in Examples 16-17. Referring to Table 4, Sunpar 2280 is an extender oil, and Vistalon 2555 is an EPDM of Exxon Chemical Company containing ethylene and propylene in a weight ratio of 55/45 with a low percentage of ENB as diene and having a Mooney viscosity ML(1+8) at 127° C. of 50. The other components are as hereinbefore described.

Processability characteristics of the compositions, measured as described for Examples 16-17 but at 160° C., are given at Table 4, as are the physical properties measured on samples press cured at 160° C. for a time of $tc_{90} \times 1.1$ minutes.

The cured sheets of each composition were tested for adhesion characteristics by measuring the properties of sandwiches prepared by the technique as described in Examples 1-7, except for these Examples 18-20 the shear strength was measured as well as peel strength. Shear strength was measured on the same size samples as for peel, after the same storage time, on the same machine and under the same conditions.

TABLE 3

| Example | | 16 | 17c |
|---|---|---|---|
| Preblend | | | |
| Vistalon 7000 | (a) | 70 | 70 |
| Esso CB 1066 | (b) | 30 | 30 |
| Maglite DE | | 0.5 | 0.5 |
| SP 1068 resin | (c) | 15 | 15 |
| DPG | (e) | 3 | — |
| OMYA BL | | 60 | 60 |
| Stearic acid | | 1 | 1 |
| ZnO | (d) | 5 | 5 |
| Ultrasil VN2 | | 10 | 10 |
| FEF N550 | | 150 | 150 |
| Flexon 876 | | 90 | 90 |
| Curative | (d) | | |
| S | | 1.5 | 1.5 |
| MBTS | | 1.5 | 1.5 |
| TMTDS | | 0.5 | 0.5 |
| ZDEDC | | 1 | 1 |
| ZDBDC | | 0.75 | 0.75 |
| CURING ODR 180° C. ARC +/− 5 | | | |
| ML | | 6 | 5.5 |
| MH | | 65 | 62 |
| $t_{S2}$, minutes | | 0.9 | 1.3 |
| $t_{c90}$, minutes | | 5.1 | 5.9 |
| PHYSICAL PROPERTIES (PRESS CURE $tc_{90} \times 1.1$, 180° C.) | | | |
| Hardness, Shore A | | 72 | 69 |
| 100 Modulus | | 3.4 | 3.5 |
| 300 Modulus | | 7.1 | — |

TABLE 3-continued

| Example | 16 | 17c |
|---|---|---|
| Tensile, NR | 7.6 | 7.9 |
| Elongation, % | 350 | 295 |
| ADHESION | | |
| N/2.5 cm (Peel) | 42.5 | 10.5 | the same Betaseal adhesive as used in Examples 1-7; in addition, sandwiches were prepared for testing using an adhesive system comprising ARDAL 515 plus 5 wt % DESMODUR R. Ardal 515 is a chloroprene rubber (CR) based adhesive supplied by Ardal Flebstoff GmbH; and DESMODUR R is an isocyanate containing activator of Bayer AG (approx 7.0 wt % NCO) as further defined in Bayer TIB Tech Inform B1 Klebstoff-Rohstoffe Nr 5.1.4.1 pub code D 950-8110/847313.

The results are shown in Table 4, in which peel strength is reported in units of Newtons, for a bond 2.5 cm in width, and shear strength is reported in units of Newtons, for a bonded area of 2.5 cm×5.0 cm. In Table 4 (cf) is an abbreviation for cohesive failure i.e. the adhesive itself tore apart, rather than the rubber separating from the adhesive layer. For comparison purposes it is noted that the industrial specification for bonding of butyl rubber sheeting requires peel/shear values of 20/120 for adhesive bonding and 45/135 for hot bonding. It will be seen therefore that the bond strengths obtained for Examples 19 and 20 are excellent compared with the comparison in Example 18, and also with the standards set for butyl sheeting.

Furthermore, the values obtained for Example 20 are exceptional by virtue of the relatively high phenol resin and aminic substance levels contained in the composition, since the shear strength for both adhesive systems is in excess of 150 N, and the peel strength is in excess of 40N.

A further aspect of the invention relates to the adhesion of a sheet of rubber composition according to the invention to polyurethane foam, for example in the production of sound deadening panels for building and other applications. EPDM is particularly useful in building applications, but as mentioned hereinbefore its generally poor adhesion to substrates, especially other polymeric materials, makes it difficult to handle. Sheeting of rubber composition having EPDM as its major elastomer component may be adhered readily to polyurethane foam by use of isocyanate prepolymer as specified above.

TABLE 4

| Example | 18c | 19 | 20 |
|---|---|---|---|
| Preblend | | | |
| Vistalon 2555 | 100 | 80 | 70 |
| Esso CB 1066 | — | 20 | 30 |
| SP1068 resin | — | 10 | 15 |
| Sunpar 2280 | 60 | 60 | 60 |
| DPG | — | 2 | 3 |
| Stearic Acid | 2 | 2 | 2 |
| FEF N 550 | 140 | 140 | 140 |
| Omya BL | 50 | 50 | 50 |
| Curative | | | |
| TMTDS | 1.8 | 1.8 | 1.8 |
| DTDM | 1.8 | 1.8 | 1.8 |
| ZnO | 10 | 10 | 10 |
| CURING ODR 160° C. ARC +/− 5 | | | |
| ML | 17 | 14 | 14 |
| MH | 61 | 55 | 51 |
| $ts_2$ | 6 | 4.2 | 4.4 |
| $tc_{90}$ | 16.8 | 20.4 | 21.8 |
| PHYSICAL PROPERTIES (PRESS CURE: $tc_{90} \times 1.1$ AT 160° C.) | | | |
| Hardness, Shore A | 72 | 71 | 69 |
| 100 modulus, MPa | 3.9 | 3.1 | 2.9 |
| 300 modulus, Mpa | 9.4 | 6.8 | 6.3 |
| Tensile, NR | 9.7 | 8.0 | 7.4 |
| Elongation, % | 325 | 410 | 415 |
| ADHESION | | | |
| Adhesive Ardal 515 + 5% wt Desmodur R | | | |
| Peel, N/2.5 cm | 6.5 | 24.7 | 41.6 (cf) |
| Shear, N/Bonded Area (2.5 cm × 5 cm) | 110 | 169 (cf) | 196 (cf) |
| ADHESIVE: BETASEAL 7 1904 HV VP 02508-2 | | | |
| Peel, N/2.5 cm | — | 39 | 48 (cf) |
| Shear, N/Bonded area (2.5 cm × 5 cm) | — | 130 | 158 (cf) |

However, the rubber compositions of the invention, even those based on uncured EPDM, may be applied in sheet form to freshly formed polyurethane foam and the foam allowed to harden. This will produce a strong bond between the rubber sheet and the foam, which in its unhardened state comprises the reactive isocyanate functionality which promotes adhesion to the rubber.

Indeed experiments have shown that a blend according to the invention and based on 70 phr of an EPM copolymer rubber of 75% ethylene content and Mooney ML(1+8) at 127° C. of 50 as its major elastomer component with 30 phr chlorobutyl rubber, is particularly useful for coating polyurethane foam. When the composition was formed into a sheet and the in situ forming polyurethane foam applied thereto, the resulting composite was found to be extremely well adhered. Strength tests resulted in the composite failing by cohesive failure, i.e. the sponge layer was torn, rather than the rubber sheet separating from the sponge. In comparison, a composite formed from a composition which contained no chlorobutyl rubber (i.e. 100 phr of EPM) and no phenol resin, when subjected to a strength test failed by interfacial separation.

I claim:

1. A curable rubber composition which in the cured state has improved adhesion to substrates through hydroxyl-reactive adhesives which composition comprises a blend of
   (a) a first elastomer having generally poor adhesion to such adhesives and comprising a copolymer of ethylene with at least one alpha-olefin and optionally a minor proportion of at least one copolymerisable polyene;
   (b) a second elastomer being a halogenated elastomeric polymer which is covulcanisable with the first elastomer and comprising a minor proportion of the combined weight of said first and second elastomers;
   (c) a phenol resin;
   (d) a curative system for said first and seocnd elastomers; and
   (e) an aminic substance capable of catalysing reaction between the phenolic groups of the phenol resin and isocyanate containing adhesives wherein said aminic substance is selected from those substances having high amine basicity and low steric hindrance of the amine moiety.

2. A composition according to claim 1 wherein the first elastomer (a) is selected from EPM and EPDM.

3. A composition according to claim 1 wherein the halogenated elastomeric polymer (b) is selected from the group consisting of chlorobutyl rubber, bromobutyl rubber, polychloroprene rubber, chlorosulphonated polyethylene and epichlorhydrin.

4. A composition according to claim 1 which comprises from 10 to 20 parts by weight of the curative system (d) per 100 parts be weight of elastomers (a) and (b) combined.

5. A composition according to claim 1 wherein the phenol resin (c) comprises a four phenolic group chain.

6. A composition according to claim 1 wherein the phenol resin (c) is $C_6$ to $C_{12}$ alkyl substituted.

7. A composition according to claim 1 wherein the resin has a melting temperature of from 80°–115° C.

8. A composition according to claim 1 which comprises from 5–45 parts by weight of elastomer (b) per 100 parts by weight of elastomer (a) and (b) combined (phr).

9. A composition according to claim 1 wherein the weight ratio of the phenol resin (c) to elastomer (b) is in the range 1:1 to 1:3.

10. A composition according to claim 1 which comprises from 2 to 25 parts by weight of phenol resin (c) per 100 parts by weight of elastomers (a) and (b) combined (phr).

11. A composition according to claim 1 wherein the aminic substance (e) is selected from those substances having high amine basicity and low steric hindrance of the amine moiety and contains at least two secondary amine groups, each substituted with at least one aryl group.

12. A composition according to claim 1 wherein the aminic substance is selected from the group consisting of diphenyl guanidine, N,N'-diphenyl-p-phenylene diamine, pyridine or triethanolamine.

13. A composition according to claim 1 which comprises from 1.5 to 5 parts by weight of aminic substance per 100 parts of weight of elastomers (a) and (b) in combination.

14. A composition according to claim 1 which additionally includes additives selected from fillers, oils, processing aids, and mixtures thereof, but excluding substantial amounts of additives which function as amine or hydroxyl group absorbents or with which isocyanate groups react preferentially, rather than phenol resins.

15. A composition according to claim 1 when in the cured state.

* * * * *